United States Patent Office 2,980,580
Patented Apr. 18, 1961

2,980,580

CYCLOHEXIMIDE ACETATE HORTICULTURAL FUNGICIDAL COMPOSITION AND METHOD OF USE

William Klomparens, Kalamazoo, Mich., assignor to The Upjohn Company, Kalamazoo, Mich., a corporation of Michigan No Drawing. Filed Mar. 19, 1956, Ser. No. 572,221

5 Claims. (Cl. 167—33)

This invention relates to novel compositions of matter and to a novel process and is particularly directed to novel compoistions and a novel process for the controlling of plant diseases.

Cycloheximide is an antibiotic substance produced as an elaboration product of Streptomyces griseus according to the procedures set forth in U.S. Patents 2,574,519 and 2,612,502; by Leach et al. in J. Am. Chem. Soc. 69, 474 (1947); and by Ford et al. in J. Am. Chem. Soc. 70, 1223–1225 (1948). Cycloheximide has been found to be an effective fungicide and to be particularly useful in the control of plant diseases.

It is known that when cycloheximide is reacted with acetic anhydride, the acetate, melting point 148–149 degrees centigrade is obtained. This compound has heretofore been thought to be biologically inactive. See Ford et al. and Leach et al., supra. Although Leach et al. report a diacetate, it was subsequently found that cycloheximide contains only one hydroxyl group and that the acetate was really the monoacetate. See Ford et al., supra, and Kornfeld et al., J. Am. Chem. Soc. 71, 150–159 (1949).

It has now been found, notwithstanding the earlier reports that cycloheximide acetate is biologically inactive, that cycloheximide acetate is effective for the control of plant fungal diseases, and that quite surprisingly the compound is translocated so that new foliage growth is protected as well as the treated foliage. This is surprising because cycloheximide is not translocated and has no protective action. It acts only to eradicate established infections in the treated foliage.

In carrying out the invention, cycloheximide acetate advantageously is dissolved in water and the water solution sprayed on foliage which it is desired to protect from fungal attack. For the most part solutions containing very low concentrations of cycloheximide acetate are advantageously used. Thus the concentration of cycloheximide acetate in the solution may range from around one to around 100 parts per million, or up to the solubility of cycloheximide acetate in water. Such solutions advantageously are prepared by dissolving the cycloheximide acetate in a water-miscible solvent such as dimethylformamide, acetone, methanol, or ethanol and adding the resulting solution to the spray tank with proper stirring and agitation. By the use of such concentrated solutions in which the cycloheximide acetate suitably can range from about one to about 25 percent or more depending upon the solubility in the solvent, the very dilute aqueous solutions which are advantageously employed according to the invention are readily prepared. A concentrate containing one percent of cycloheximide acetate in ethanol provides a composition which for each level teaspoon (5 cc.) per gallon give about thirteen to fourteen parts of cycloheximide acetate per million parts of water. Each pint per 100 gallons provides about the same concentration. Similarly at 17.5 percent solution in dimethylformamide (or acetone or methanol or ethanol) when diluted provides about thirteen to fourteen parts of cycloheximide acetate for each million parts of water.

Wetting and spreading agents can be included in the spray solutions in accordance with the usual practice in the agricultural art. Anionic, cationic, and non-ionic surfactants can be used. Suitable surfactants include alkyl sulfates and sulfonates, alkylarylsulfonates, sulfosuccinate esters, polyoxyethylene sulfates, polyoxyethylene sorbitan monolaurate, alkylarylpolyether sulfates, alkylarylpolyether alcohols, alkylnaphthalene sulfonates, alkyl quaternary ammonium salts, sulfated fatty acid esters, sulfated fatty acid amides, glycerol manitan laurate, polyalkylether condensates of fatty acids, and ligninsulfonates.

If desired, the active material can be compounded into a wettable powder. Thus cycloheximide acetate can be milled with an inert powder such as talc, pyrophyllite, Georgia clay, bentonite, or mixtures thereof and a wetting and dispersing material to provide a composition which is readily incorporated into a spray solution. A suitable formulation is obtained by milling and blending 434.5 pounds of Georgia clay, 4.5 pounds of Triton X-100 (an alkylarylpolyether alcohol) as a wetting agent, 9 pounds of Daxad 27 (polymerized sodium salts of substituted benzoid long chain alkyl sulfonic acid) as a dispersant, and 5.5 pounds of cycloheximide acetate. The resulting composition has the following percentage (by weight) composition.

| | Percent |
|---|---|
| Cycloheximide acetate | 1.2 |
| Triton X-100 | 1 |
| Daxad 27 | 2 |
| Georgia clay | 95.8 |

This formulation when added to water at one pound per hundred gallons gives a spray formulation containing about 13 to 14 parts per million of cycloheximide acetate.

The efficacy of cycloheximide acetate for the control of cherry leaf spot caused by Coccomyces hiemalis is shown in the following table.

Young cherry trees were sprayed with water solutions containing cycloheximide acetate in the concentrations indicated and allowed to grow for five days. Strings were tied as needed to delineate the new growth from the old. After five days the plants were inoculated with Coccomyces hiemalis.

TABLE I

| Treatment | No. Infected Lvs. | | Lesions per 2 sq. in. | |
|---|---|---|---|---|
| | Below String | Above String | Av. 4½ Lvs. Below String | Av. of Lvs. Above String [1] |
| Cycloheximide acetate: | | | | |
| 10 p.p.m | 0.5 | 1.0 | T | 5 |
| 60 p.p.m | 0.0 | 0.0 | 0 | 0 |
| REPLICATE | | | | |
| Cycloheximide acetate: | | | | |
| 10 p.p.m | 0.0 | 1.0 | 0 | 2 |
| 60 p.p.m | 0.0 | 0.0 | 0 | 0 |
| CONTROL | | | | |
| Unsprayed | 8.3 | 2.3 | 122 | 38 |

[1] Average of all leaves above the string which was usually 2-3 leaves.

The data given in this table show that the infection was controlled in both the old and the new foliage showing that the fungicide was transtreated from the old foliage to the new.

The efficacy of cycloheximide acetate for the control of apple scab is shown in the following table. Young Jonathan apple trees were sprayed with water solutions containing fifty parts per million of cycloheximide acetate. Before spraying, the top one-third of three branches were covered to protect the foliage from the spray. After three days the unsprayed leaves and control leaves were inoculated with *Venturia inaequalis*. After sixteen days, six leaves were taken at random from the unsprayed inoculated leaves and the control plants.

TABLE II

*Apple scab*

| Treatment | Average Number of Lesions per leaf |
|---|---|
| Cycloheximide acetate: 50 p.p.m | 1.66 |
| Control | 10.5 |

The data in this table show that the fungicide is translocated from the sprayed leaves to the unsprayed leaves in sufficient concentration to inhibit growth of the organism.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A process for the protection of plants subject to fungal attack which comprises applying cycloheximide acetate to the foliage of said plants.

2. The process of claim 1 in which the foliage is sprayed with an aqueous solution of cycloheximide acetate.

3. A process for the protection of plants subject to fungal diseases which comprises applying cycloheximide acetate to said plants whereby the fungal factor is systemically translocated and thus effecting control of disease in new growth and parts of the plant to which cycloheximide acetate may not have been applied.

4. A solid horticultural fungicidal composition comprising cycloheximide acetate, a dispersing agent, and a water-dispersible material.

5. The composition of claim 4 in which the water-dispersible material is a wettable inert powder.

References Cited in the file of this patent

Goldberg et al.: "Antibiotics, Their Chemistry and Non-Medical Uses," D. Van Nostrand Co., Inc., Princeton, N.J., entry: "Cycloheximide," pp. 44, 70, 71, 123, 322, 330, 333, 336, 337, 339, 347–348, 354, 362–363, 373, 374, 380, 389. © 1959.

Cereal Chemistry, vol. 32, pp. 208–211, May 1955.

Wallen et al.: Phytopathology, vol. 47:5, pp. 291–295 and 312, May 1957.

Jour. Am. Chem. Soc. (Ford et al.), vol. 70, 1948, pp. 1223–1224.

Manufacturing Chemist, May 1955, page 195.